(12) United States Patent
Imada et al.

(10) Patent No.: US 10,576,458 B2
(45) Date of Patent: Mar. 3, 2020

(54) CATALYST STRUCTURE FOR EXHAUST GAS TREATMENT

(71) Applicant: Mitsui Mining & Smelting Co., Ltd., Tokyo (JP)

(72) Inventors: Yasunori Imada, Saitama (JP); Yunosuke Nakahara, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 829 days.

(21) Appl. No.: 14/779,704

(22) PCT Filed: Mar. 13, 2014

(86) PCT No.: PCT/JP2014/056637
§ 371 (c)(1),
(2) Date: Sep. 24, 2015

(87) PCT Pub. No.: WO2014/156676
PCT Pub. Date: Oct. 2, 2014

(65) Prior Publication Data
US 2016/0045896 A1 Feb. 18, 2016

(30) Foreign Application Priority Data

Mar. 29, 2013 (JP) .................. 2013-072486

(51) Int. Cl.
*B01J 23/00* (2006.01)
*B01J 23/63* (2006.01)
(Continued)

(52) U.S. Cl.
CPC .......... *B01J 23/002* (2013.01); *B01D 53/945* (2013.01); *B01J 23/10* (2013.01); *B01J 23/63* (2013.01);
(Continued)

(58) Field of Classification Search
CPC ................................ B01D 2255/908
See application file for complete search history.

(56) References Cited

U.S. PATENT DOCUMENTS 5,597,771 A * 1/1997 Hu .................. B01D 53/945
502/303
8,956,994 B2 2/2015 Ifrah
(Continued)

FOREIGN PATENT DOCUMENTS

JP 59171744 11/1984
JP 61164647 7/1986
(Continued)

OTHER PUBLICATIONS

English language translation of JP61-164647 generated on May 3, 2018 with Espacenet website (http://www.epo.org/searching-for-patents/technical/espacenet.html#tab-1).*
(Continued)

*Primary Examiner* — Mark Ruthkosky
*Assistant Examiner* — Julia L Rummel
(74) *Attorney, Agent, or Firm* — Rankin, Hill & Clark LLP (57) ABSTRACT

Provided is a new catalyst structure for exhaust gas treatment including an upper catalyst layer and a lower catalyst layer, in which the catalyst structure can sufficiently exhibit functions as a three way catalyst while maintaining gas diffusibility. Proposed is a catalyst structure including a substrate, an upper catalyst layer, and a lower catalyst layer, the catalyst structure having a first peak or a second peak at a pore volume diameter of 10 nm to 50 nm and a pore volume diameter of 50 nm to 100 nm, respectively, in the logarithmic differential pore volume distribution analyzed by a mercury intrusion porosimeter.

3 Claims, 1 Drawing Sheet (51) Int. Cl.
*B01J 35/10* (2006.01)
*F01N 3/28* (2006.01)
*B01J 37/02* (2006.01)
*B01J 23/10* (2006.01)
*B01D 53/94* (2006.01)
*B01J 37/03* (2006.01)

(52) U.S. Cl.
CPC .......... *B01J 35/108* (2013.01); *B01J 35/109* (2013.01); *B01J 35/1061* (2013.01); *B01J 35/1066* (2013.01); *B01J 37/0244* (2013.01); *F01N 3/2803* (2013.01); *B01D 2255/908* (2013.01); *B01D 2255/9022* (2013.01); *B01D 2255/9202* (2013.01); *B01J 37/0234* (2013.01); *B01J 37/03* (2013.01); *B01J 2523/00* (2013.01); *Y02T 10/22* (2013.01)

(56) References Cited

U.S. PATENT DOCUMENTS

| | | | |
|---|---|---|---|
| 2006/0090651 A1* | 5/2006 | Liu | B01D 46/0021 96/121 |
| 2009/0044521 A1 | 2/2009 | Tanikawa | |
| 2009/0131249 A1* | 5/2009 | Takeshima | B01D 53/945 502/263 |
| 2010/0311575 A1* | 12/2010 | Wakabayashi | B01D 53/945 502/244 |
| 2013/0142713 A1 | 6/2013 | Ifrah | |

FOREIGN PATENT DOCUMENTS

| | | |
|---|---|---|
| JP | 0256247 | 2/1990 |
| JP | 0724323 | 1/1995 |
| JP | 10099684 | 4/1998 |
| JP | 2004298813 A2 | 10/2004 |
| JP | 2006110485 A2 | 4/2006 |
| JP | 2007144412 A2 | 6/2007 |
| JP | 2008178766 A2 | 8/2008 |
| JP | 2009165929 A2 | 7/2009 |
| JP | 2010201362 A2 | 9/2010 |
| JP | 201116124 | 1/2011 |
| JP | 2011161421 A2 | 8/2011 |
| JP | 2013525255 | 6/2013 |
| JP | 2013158729 A2 | 8/2013 |

OTHER PUBLICATIONS

English language translation of JP 2004-298813 generated on May 3, 2018 with Espacenet website (http://www.epo.org/searching-for-patents/technical/espacenet.html#tab-1).*

International Search Report dated Jun. 3, 2014 filed in PCT/JP2014/056637.

Birgersson H et al: "An investigation of a new regeneration method of commercial aged three-way catalysts", Applied Catalysis B:Environmental, Elsevier, Amsterdam, NL, vol. 65, No. 1-2,May 15, 2006, pp. 93-100.

Extended European Search Report dated Nov. 2, 2016 issued in the corresponding European patent application No. 14773648.2.

Hong He et al.: "Environmental Catalysis: Principles and Applications", Oct. 31, 2008 and its partial English translation.

* cited by examiner

[FIG.1]

CATALYST STRUCTURE FOR EXHAUST GAS TREATMENT

TECHNICAL FIELD

The present invention relates to a catalyst structure which can be used to purify exhaust gas emitted from an internal combustion engine of an automobile or the like, that is, a catalyst structure for exhaust gas treatment.

BACKGROUND ART

Exhaust gases of internal combustion engines of automobiles that use gasoline as fuel include harmful components such as hydrocarbons (HC), carbon monoxide (CO) and nitrogen oxides (NOx), and therefore, it is necessary to simultaneously purify and emit the respective harmful components using a redox reaction. For example, it is necessary to perform purification by converting hydrocarbons (HC) into water and carbon dioxide through oxidation, converting carbon monoxide (CO) into carbon dioxide through oxidation, and converting nitrogen oxides (NOx) into nitrogen through reduction.

As catalysts for treating the exhaust gases from such an internal combustion engine (hereinafter, referred to as "exhaust gas purifying catalyst"), three way catalysts (TWC) that can oxidize and reduce CO, HC and NOx have been used.

Regarding this kind of three way catalysts, for example, there is known a catalyst in which a precious metal is supported on a refractory oxide porous material such as an alumina porous material having a large surface area, and this is supported on a substrate, for example, a monolithic substrate having a refractory ceramic or metallic honeycomb structure, or is supported on refractory particles.

Since the bonding force between a precious metal as a catalytically active component and a substrate is not very strong, even if it is attempted to have the precious metal directly supported on the substrate, it is difficult to secure a sufficient supporting amount. Thus, in order to have a sufficient amount of a catalytically active component supported on the surface of a substrate, supporting of precious metals on a carrier having a high specific surface area has been implemented.

Regarding this kind of carrier, porous materials formed from refractory inorganic oxides such as silica, alumina and titania compounds have been traditionally known. Furthermore, in recent years, attention has been paid to apatite type composite oxides, which can provide carriers that have excellent heat resistance and can prevent sintering of the supported metal catalyst particles.

In regard to carriers formed from apatite type composite oxides, for example, Patent Document 1 (JP H7-24323 A) discloses a carrier formed from an apatite compound represented by formula: $M_{10} \cdot (ZO_4)_6 \cdot X_2$ (wherein some or all of M's represent one kind or two or more kinds of transition metals selected from the elements of Group 1B and/or Group 8 of the Periodic Table, and preferably one kind or two or more kinds of transition metals selected from copper, cobalt, nickel, and/or iron, while these transition metals are included at a proportion of 0.5 wt % to 10 wt %; Z represents a trivalent to heptavalent cation; and X represents a monovalent to trivalent anion).

In Patent Document 2 (JP 2007-144412 A), as a catalyst with which the effect of purifying exhaust gas is achieved even in a relatively low temperature state and the purification performance as a three way catalyst is achieved even in a high temperature region, there is disclosed a catalyst for exhaust gas purification, which is composed of a composite oxide represented by $(La_{a-x}M_x)(Si_{6-y}N_y)O_{27-z}$ and a precious metal component that forms a solid solution with the composite oxide or is supported thereon, and has high low-temperature activity and excellent heat resistance so that stabilized exhaust gas purification performance can be obtained therewith.

Patent Document 3 (JP 2011-16124 A) discloses a catalyst for exhaust gas purification, which is composed of a composite oxide represented by formula: $(A_{a-w-x}M_wM'_x)(Si_{6-y}N_y)O_{27-z}$ (wherein A represents a cation of at least one element of La and Pr; M represents a cation of at least one element of Ba, Ca and Sr; M' represents a cation of at least one element of Nd, Y, Al, Pr, Ce, Sr, Li and Ca; N represents a cation of at least one element of Fe, Cu and Al; $6 \leq a \leq 10$; $0 < w < 5$; $0 \leq x < 5$; $0 < w+x < 5$; $0 < y \leq 3$, $0 \leq z \leq 3$; $A \neq M'$; and when A is a cation of La, $x \neq 0$), and a precious metal component that forms a solid solution with the composite oxide or is supported thereon.

However, three way catalysts including a catalyst layer composed of two layers or more layers have been hitherto suggested. These catalysts are being used for the purpose of assigning different functions to the respective catalyst layers, or of separating those components that have deteriorated activity when incorporated together in a same layer, into various layers.

For example, Patent Document 4 (JP 2-56247 A) discloses a low-temperature HC trap catalyst configured to include a catalyst layer composed of an upper layer and a lower layer on a honeycomb carrier, in which the lower layer is a HC adsorbent layer containing zeolite as a main component, and the upper layer is a purifying catalyst layer supporting a catalytic metal. With this catalyst, exhaust gas that has entered into the carrier cell passages diffuses into the HC adsorbent layer by passing through the upper purifying catalyst layer from the surface on the cell passage side to the surface on the HC adsorbent layer of the lower layer, and as a result, HC in the exhaust gas is adsorbed to the zeolite that constitutes the HC adsorbent layer at a low temperature. Furthermore, when the temperature of the catalyst, more particularly the temperature of the HC adsorbent layer, increases to a high temperature to a certain extent, for example, 120° C. to 200° C., along with the increase in the exhaust gas temperature, HC that has been adsorbed begins to escape, and the HC passes through the purifying catalyst layer of the upper layer from the lower HC adsorbent layer to the cell passage side and then flows out to the outside of the carrier cell passages. At that time, when the HC passes through the purifying catalyst layer, the HC is purified by being oxidized to water ($H_2O$) or carbon dioxide ($CO_2$) by the catalytic action of the catalyst metal.

Patent Document 5 (JP 2004-298813 A) discloses a layered catalyst including a carrier formed of a ceramic or a metal material; a first catalyst layer formed on the carrier; and a second catalyst layer formed on the first catalyst layer, in which the first catalyst layer is formed from a composite ceramic containing platinum-supported alumina having a platinum component supported on porous alumina, and an oxygen-storable ceria-zirconia composite oxide; and the second catalyst layer is formed from a composite ceramic containing at least one of a rhodium-supported ceria-zirconia composite oxide and a rhodium-supported alumina, which are obtained by supporting a rhodium component on a less heat-deteriorative ceria-zirconia composite oxide or porous alumina, and at least one of porous alumina and a less heat-deteriorative ceria-zirconia composite oxide.

When a catalyst layer composed of two layers or more layers is formed, there is a problem that it is difficult for the exhaust gas to diffuse into the interior of the catalyst layer on the substrate side. In order to solve such a problem, suggestions as follows have been made.

For example, Patent Document 6 (JP 2006-110485 A) discloses an exhaust gas purifying catalyst which increases the catalytic efficiency by increasing the gas diffusibility of exhaust gas in the catalyst layer, the exhaust gas catalyst including at least a carrier and plural layers formed on the carrier, in which at least one layer of the plural layers contains a catalyst component, at least one layer of the plural layers contains a catalyst component and also has pores in the layer, and the average diameter of the pores is from 0.2 μm to 500 μm.

Patent Document 7 (JP 2010-201362 A) suggests a catalyst carrier which can secure sufficient gas diffusibility and can suppress the grain growth of the catalyst metal, the catalyst carrier including a silicon carbide-based porous structure having a spongy three-dimensional skeleton part formed of a silicon carbide-based ceramic and a continuous pore part formed between the three-dimensional skeleton; a metal silicon layer formed on the surface of the three-dimensional skeleton part; and a $SiO_2$ layer formed as a result of at least partial oxidation of the metal silicon layer.

Patent Document 8 (JP 2009-165929 A) discloses a catalyst for exhaust gas purification having a HC adsorbent layer provided on a honeycomb carrier; and a purifying catalyst layer laminated on this HC adsorbent layer, in which in order to increase the proportion the exhaust gas that passes through the purifying catalyst layer of the upper layer and diffuses to the HC adsorbent layer of the lower layer, to increase the amount of HC that is adsorbed to the HC adsorbent layer of the lower layer, and to increase the HC purification ratio while it is cold, plural fine passages having an average diameter larger than the average diameter of the particles that constitute the purifying catalyst layer, are formed in a dispersed manner in the purifying catalyst layer such that passages through which HC in the exhaust gas flowing through carrier cell passages can pass from the surface on the cell passage side of the purifying catalyst layer to the surface on the HC adsorbent layer side are generated.

CITATION LIST

Patent Document

Patent Document 1: JP H7-24323 A
Patent Document 2: JP 2007-144412 A
Patent Document 3: JP 2011-16124 A
Patent Document 4: JP H2-56247 A
Patent Document 5: JP 2004-298813 A
Patent Document 6: JP 2006-110485 A
Patent Document 7: JP 2010-201362 A
Patent Document 8: JP 2009-165929 A

DISCLOSURE OF THE INVENTION

Problem to be Solved by the Invention

An object of the present invention is to provide a new catalyst structure for exhaust gas treatment having an upper catalyst layer and a lower catalyst layer, which can maintain gas diffusibility and can sufficiently exhibit a function as a three way catalyst.

Means for Solving Problem

The present invention suggests a catalyst structure including a substrate, an upper catalyst layer and a lower catalyst layer, the catalyst structure having a first peak or a second peak at a pore volume diameter of 10 nm to 50 nm and a pore volume diameter of 50 nm to 100 nm, respectively, in a logarithmic differential pore volume distribution analyzed with a mercury intrusion porosimeter.

Effect of the Invention

The catalyst structure suggested by the present invention can increase gas diffusibility to the deep part of the catalyst layer and can sufficiently exhibit a function as a three way catalyst, by producing the catalyst structure so as to have a first peak or a second peak at a pore volume diameter of 10 nm to 50 nm and a pore volume diameter of 50 nm to 100 nm, respectively.

MODE(S) FOR CARRYING OUT THE INVENTION

Figure 1:
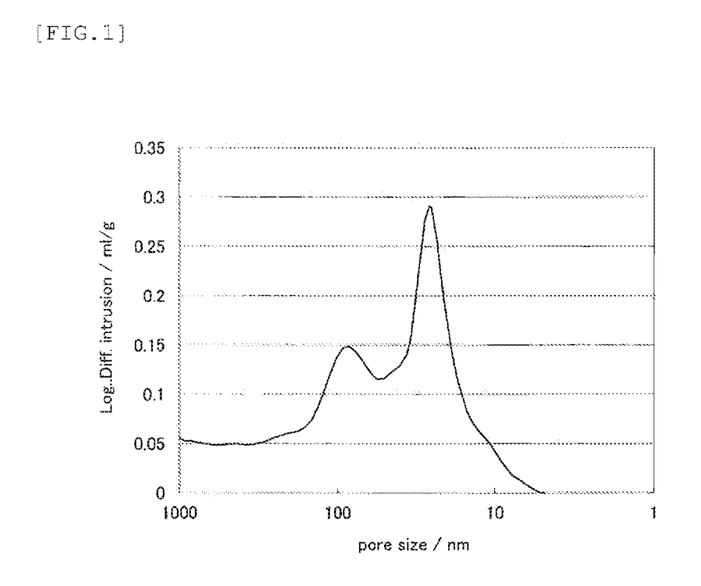
FIG. 1 is a pore distribution chart of the catalyst structure obtained in Example 7.

Next, the present invention will be explained based on an exemplary embodiment. However, the present invention is not intended to be limited to the exemplary embodiment described below.

<Present Catalyst Structure>

The catalyst structure as an exemplary embodiment of the present invention (hereinafter, referred to as "present catalyst structure") includes a substrate, an upper catalyst layer and a lower catalyst layer, the catalyst structure having, when the pore distribution is analyzed with a mercury intrusion porosimeter, a first peak or a second peak exists at a pore volume diameter of 10 nm to 50 nm and a pore volume diameter of 50 nm to 100 nm, respectively, in the pore volume diameter range of 5 nm to 200 nm of the logarithmic differential pore volume distribution thus obtained. Among them, it is preferable that the first peak exists at a pore volume diameter of 10 nm to 50 nm, and the second peak exists at a pore volume diameter of 50 nm to 100 nm.

As such, when the catalyst structure is produced so as to have a pore distribution having a first peak or a second peak at a pore volume diameter of 10 nm to 50 nm and a pore volume diameter of 50 nm to 100 nm, respectively, catalytic reactivity of the catalyst layer can be maintained while maintaining gas diffusibility, and thereby the functions as a three way catalyst can be sufficiently manifested.

However, since it is desirable that the present catalyst structure includes a substrate, an upper catalyst layer and a lower catalyst layer, for example, the lower catalyst layer may be formed on the surface of the substrate, or the lower catalyst layer may be formed over the surface of the substrate, with another layer interposed therebetween. Furthermore, another layer may exist between the upper catalyst layer and the lower catalyst layer, or on the upper side of the upper catalyst layer. Also, it is preferable that both the upper catalyst layer and the lower catalyst layer contain an inorganic porous material, and the inorganic porous material contained in the upper catalyst layer has a different composition or a different pore distribution, compared to the inorganic porous material contained in the lower catalyst layer.

Here, the "first peak" refers to a peak having the highest peak height in a logarithmic differential pore volume distribution analyzed with a mercury intrusion porosimeter, and the "second peak" refers to a peak having the second highest peak height.

Furthermore, the phrase "having a first peak or a second peak at a pore volume diameter of 10 nm to 50 nm and a pore volume diameter of 50 nm to 100 nm, respectively" means that the first peak or the second peak exists at a pore volume diameter of 10 nm to 50 nm and a pore volume diameter of 50 nm to 100 nm, respectively. That is, it may be such that the first peak exists at a pore volume diameter of 10 nm to 50 nm, while the second peak exists at a pore volume diameter of 50 nm to 100 nm, or the first peak exists at a pore volume diameter of 50 nm to 100 nm, while the second peak exists at a pore volume diameter of 10 nm to 50 nm.

Meanwhile, the line on the occasion of assuming that those peaks do not exist, that is, peaks having a vertical height from the background of less than 0.002 ml/g, may be considered as the noise of the analytic apparatus or the like, and therefore, the line does not correspond to the "peak" defined by the present invention.

A preferred example of the present catalyst structure is a catalyst structure in which the lower catalyst layer has a first peak or a second peak at a pore volume diameter of 10 nm to 50 nm, and the upper catalyst layer has a second peak or a first peak at a pore volume diameter of 50 nm to 100 nm.

When the upper catalyst layer has a second peak or a first peak at a pore volume diameter of 50 nm to 100 nm, satisfactory gas diffusibility of the upper catalyst layer is obtained, and thereby exhaust gas can be appropriately circulated in the lower catalyst layer. Also, a sufficient surface area can be secured, and a sufficient dispersity can be secured. Therefore, for example, sintering of the precious metal that is supported can be suppressed.

Furthermore, when the lower catalyst layer has a first peak or a second peak at a pore volume diameter of 10 nm to 50 nm, exhaust gas can be circulated in the entire lower catalyst layer, and exhaust gas can be appropriately handled so that a catalyst reaction can be efficiently achieved.

The difference between the pore volume diameter of the first peak and the pore volume diameter of the second peak is preferably 20 nm to 60 nm, and more preferably no less than 40 nm or no more than 50 nm.

When the volume diameter of all the pores is made uniformly large, gas diffusion occurs satisfactorily; however, there is a possibility that the surface area may tend to decrease, or dispersibility of the precious metal may tend to decrease. Thus, for example, in a case in which the lower catalyst layer has a first peak or a second peak at a pore volume diameter of 10 nm to 50 nm, the upper catalyst layer has a second peak or a first peak at a pore volume diameter of 50 nm to 100 nm, when the difference between the pore volume diameter of the first peak and the pore volume diameter of the second peak is set to 20 nm to 60 nm, gas diffusibility in the upper layer can be secured, while a sufficient surface area or precious metal dispersibility in the lower layer can be reliably secured.

Furthermore, in regard to the first peak and the second peak, the differential pore volume is preferably 0.01 ml/g or more, more preferably no less than 0.05 ml/g or no more than 5 ml/g, and even more preferably 0.10 ml/g to 2 ml/g or less.

In regard to the present catalyst structure, the pore volume diameter of a peak and the differential pore volume thereof in a logarithmic differential pore volume distribution can be regulated by changing the pore volume diameter and the differential pore volume of apatite or the OSC material, more particularly the amount of the apatite or the OSC material, the calcination conditions, the thicknesses of the various layers, and the like.

Particularly, the amount of apatite or the OSC material, and the thicknesses of the various layers have significant influence on the differential pore volume, and the calcination conditions have significant influence on the pore volume diameter. That is, when the calcination temperature is increased, the pore volume diameter tends to increase, and when the calcination temperature is decreased, the pore volume diameter tends to decrease.

Incidentally, the peaks at the pore volume diameter of 10 nm to 50 nm and at the pore volume diameter of 50 nm to 100 nm are peaks originating from the pores of both the upper and lower catalyst layers. Any peak originating from the pores of the substrate does not appear in such a numerical value range of the pore volume diameter.

The mercury intrusion porosimeter described above is an apparatus which, by utilizing the property of mercury having high surface tension, causes mercury to intrude by applying pressure to an object of analysis, and analyzes the pore volume diameter and the logarithmic differential pore volume distribution from the pressure applied at that time and the amount of intruded mercury. Therefore, the pores to be analyzed are limited to open pores (pores in communication with the outside) only, and closed pores (independent pores) are not included in the object of analysis.

Furthermore, the "pore volume diameter" means the diameter of the bottom surface when a pore is assumed to approximate a column, and is calculated by the following formula:

$$dr = -4\sigma\cos\theta/p \,(\sigma\text{:surface tension}, \theta\text{:contact angle}, p\text{:pressure})$$

In this formula, since the surface tension of mercury is already known, and the contact angle value is intrinsic to the apparatus, the pore volume diameter can be calculated from the pressure of intruded mercury.

<Upper Catalyst Layer>

Examples of the inorganic porous material of the upper catalyst layer include inorganic porous materials of a compound selected from the group consisting of an oxide having an apatite type crystal structure (also referred to as "apatite type composite oxide" or "apatite"), silica, alumina and titania compounds; and an OSC material (the OSC material will be explained below). The inorganic porous material may include any one kind or two or more kinds thereof. It is preferable that the upper catalyst layer is a porous layer containing these inorganic porous materials.

Among them, an apatite type composite oxide is preferred from the viewpoint that pores having a predetermined size can be easily formed therein, and when an apatite type composite oxide is used as the inorganic porous material of the upper catalyst layer, gas diffusibility to the lower catalyst layer can be increased more easily. Furthermore, an apatite type composite oxide not only functions as a carrier that supports precious metals, but also has a catalytic activity of oxidizing hydrocarbons (HC) and carbon monoxide (CO) and a catalytic activity of reducing nitrogen oxides (NOx). Therefore, when an apatite type composite oxide is used as a carrier, there is an advantage that the content of precious metals can be decreased.

Therefore, from the viewpoint of increasing gas diffusibility to the lower catalyst layer, it is preferable that an apatite type composite oxide occupies 50% by mass or more of the inorganic porous material included in the upper catalyst layer, and it is more preferable that the apatite type composite oxide occupies 70% by mass or more, even more preferably 80% by mass or more, and particularly preferably 90% by mass or more (including 100% by mass), of the inorganic porous material.

However, the upper catalyst layer may contain, for example, alumina, an OSC material, or another inorganic porous material, as a porous material other than the apatite type composite oxide (the details will be described below).

(Apatite)

The apatite included in the upper catalyst layer is desirably an oxide having an apatite type crystal structure, and an example thereof is a La-based apatite represented by formula $(La_{a-x}M_x)(Si_{6-y}N_y)O_{27-z}$ (wherein M represents a monovalent to trivalent cation; N represents a trivalent to heptavalent cation; $8 \leq a \leq 10$; $0 \leq x \leq 5$; $0 \leq y \leq 3$; and $0 \leq z \leq 2$).

At this time, if the apatite has a stoichiometric composition, a=10; and if the apatite has a non-stoichiometric composition, a<10. For a composite oxide of the above-mentioned formula having a non-stoichiometric composition, the range of a of the composite oxide that is practically easily available is such that $8 \leq a < 10$.

In the above formula, M represents a cation that substitutes a portion of La-sites, and an example thereof is a cation of at least one element selected from the group consisting of Ca, Al, Ce, Ba, Sr, Li, Nd, and Pr.

Furthermore, in the above formula, N represents a cation that substitutes a portion of Si-sites, and an example of N is a cation of at least one element selected from the group consisting of Fe, Cu, and Al.

Specific examples of the La-based apatite of this kind include $La_{9.33}Si_6O_{26}$, $La_{8.33}BaSi_6O_{26}$, $La_{8.33}CaSi_6O_{26}$, $La_{8.33}SrSi_6O_{26}$, $La_{8.33}BaSi_{4.5}Fe_{1.5}O_{26}$, $La_{6.83}Pr_3Si_{4.5}Fe_{1.5}O_{27}$, and $La_{7.33}BaYSi_6O_{25.50}$.

Among them, a La-based apatite having more vacancies than the case in which the molar ratio of La sites is 9.33 (also referred to as "A-site vacancy apatite") is preferred.

It was found that when the relevant apatite has more vacancies at the La-site compared to a La-based apatite type composite oxide having a composition in which the molar ratio of La-sites is 9.33 (referred to as "9.33-composition"), the lattice oxygen of the apatite crystal structure can be activated, the catalytic reaction can be further accelerated compared to the La-based apatite type composite oxide having the 9.33-composition, and the catalytic reaction can be induced at a lower temperature.

A specific example thereof is an apatite represented by composition formula (1): $(LaA)_{9.33-\delta}B_6O_{27.00-\gamma}$ (wherein $0.3 \leq \delta \leq 3.0$, and $0.0 < \gamma \leq 6.0$).

"A" in the above composition formula (1) represents a cation that substitutes a portion of La-sites, and represents any one kind or two or more kinds of elements selected from Ba, Pr, Y, Sr, Mg, and Ce. In addition to that, there is also a possibility that "A" may include Ca, Al, Li, Nd or the like.

On the other hand, "B" in the above composition formula (1) represents any one kind or two or more kinds of elements selected from Si, P and Fe. When the compound contains Si, it can be said that "B" represents a cation that substitutes a portion of Si-sites. In addition to that, there is also a possibility that "B" may include Cu, Al or the like.

In the above composition formula (1), the molar ratio of the element that is included at the La-site is defined to be "9.33–δ". That is, it is indicated that the present composite oxide has more vacancies as many as "δ" sites, compared with the composition in which the molar ratio of the La-sites is 9.33 (referred to as "9.33-composition"), which is generally considered as a standard composition.

Furthermore, "δ" is preferably 0.3 to 3.0, and more preferably 0.3 to 2.3, and among them, it is even more preferable that δ is no less than 0.8 or no more than 1.3.

The molar ratio of La is preferably 2.50 to 6.00, and more preferably no less than 3.00 or no more than 5.00.

In addition, in a case in which the composition includes Pr, the molar ratio of Pr is preferably 0.5 to 3.0, and more preferably no less than 1.0 or no more than 2.0.

The term "27.00–γ" representing the molar ratio of oxygen (O), that is, the molar ratio of oxygen, has a value calculated by the following calculation formula, when the elements present at the La-site include A1, A2, ..., and An, the molar ratios of the elements are designated as x1, x2, ..., and xn; and the valences of the elements are designated as a1, a2, ..., and an:

"$27.00-\gamma$"=$(x1 \times a1 + x2 \times a2 + ... + xn \times an)/2$

Specific examples of the A-site vacancy apatite include, for example, $La_{9.33-\delta}Si_6O_{27.00-\gamma}$, $(LaBa)_{9.33-\delta}Si_6O_{27.00-\gamma}$, $(LaBaY)_{9.33-\delta}Si_6O_{27.00-\gamma}$, $(LaBaSr)_{9.33-\delta}Si_6O_{27.00-\gamma}$, $(LaBaMg)_{9.33-\delta}Si_6O_{27.00-\gamma}$, $(LaBaCe)_{9.33-\delta}Si_6O_{27.00-\gamma}$, $(LaPr)_{9.33-\delta}Si_6O_{27.00-\gamma}$, $(LaPrBa)_{9.33-\delta}Si_6O_{27.00-\gamma}$, $(LaPrY)_{9.33-\delta}Si_6O_{27.00-\gamma}$, $(LaPrSr)_{9.33-\delta}Si_6O_{27.00-\gamma}$, $(LaPrMg)_{9.33-\delta}Si_6O_{27.00-\gamma}$, $(LaPrCe)_{9.33-\delta}Si_6O_{27.00-\gamma}$, $(LaPrBaY)_{9.33-\delta}Si_6O_{27.00-\gamma}$, $(LaPrBaSr)_{9.33-\delta}Si_6O_{27.00-\gamma}$, $(LaPrBaCe)_{9.33-\delta}Si_6O_{27.00-\gamma}$, and $(LaPrBaMg)_{9.33-\delta}Si_6O_{27.00-\gamma}$.

Whether the present catalyst carrier contains an apatite represented by the above composition formula, can be confirmed by checking the presence of apatite based on the diffraction peaks of X-ray diffractometry (XRD), and measuring the masses of the elements by ICP.

The pore distribution of the inorganic porous material as a raw material, for example, apatite as a raw material, affects the pore distribution of the upper catalyst layer and the present catalyst structure. From such a viewpoint, the pore distribution of the inorganic porous material is preferably such that in the logarithmic differential pore volume distribution analyzed with a mercury intrusion porosimeter, the pore distribution has a first peak at a pore volume diameter in the range of 40 nm to 110 nm, and more preferably in the range of no less than 50 nm or no more than 80 nm, and the differential pore volume is in the range of 0.05 ml/g to 10 ml/g, more preferably in the range of no less than 0.1 ml/g or no more than 5 ml/g, and even more preferably in the range of no less than 0.1 ml/g or no more than 2 ml/g.

Meanwhile, in a case in which an apatite is used as the inorganic porous material, the apatite as a raw material can be obtained, for example, in the case of producing a composite oxide containing La, Pr, Ba, Si and O, lanthanum nitrate, barium nitrate, praseodymium (Pr) nitrate, colloidal silica, and optionally other raw material components are added to deionized water, the mixture is stirred to obtain a transparent solution, this transparent solution is added dropwise to a mixed solution of aqueous ammonia and ammonium carbonate, a precipitate is precipitated by hydrolysis, the precipitate thus obtained is aged at a predetermined temperature, subsequently washed with water, filtered, and dried to thereby obtain a precursor, and the precursor is calcined at 800° C. to 1000° C. in an air atmosphere. However, the production method is not intended to be limited to such a production method.

The specific surface area of the apatite is preferably in the range of 5 to 100 m²/g.

(Other Porous Material)

Regarding the porous material of the upper catalyst layer, as described above, in addition to the apatite type composite oxide, for example, a porous material of a compound selected from the group consisting of silica, alumina and titania compounds, more specifically, for example, a porous material formed from a compound selected from alumina, silica, silica-alumina, aluminosilicates, alumina-zirconia, alumina-chromia, and alumina-ceria; and OSC materials (OSC materials will be explained below).

For example, it is also possible to form the upper catalyst layer using an inorganic porous material of an OSC material, an inorganic porous material of a silica, alumina or titania compound, or the like as a main porous material. Among these, regarding the alumina, alumina having a specific surface area of more than 50 m$^2$/g, for example, for example, γ-, δ-, θ- and α-alumina can be used. Among them, it is preferable to use γ-alumina. In regard to the alumina, the alumina may contain a trace amount of La in order to increase heat resistance.

(OSC Material)

The OSC material that is contained in the upper catalyst layer may be any inorganic porous material having oxygen storage capacity (OSC). Examples thereof include inorganic porous materials formed from a cerium compound, a zirconium compound, a ceria-zirconia composite oxide, and the like.

(Catalytically Active Component)

The upper catalyst layer can contain, as a catalytically active component, that is, as a metal having catalytic activity, for example, metals such as palladium, platinum, rhodium, gold, silver, ruthenium, iridium, nickel, cerium, cobalt, copper, osmium, and strontium. Among them, it is preferable that the upper catalyst layer contains platinum, palladium, rhodium or iridium.

When the upper catalyst layer contains palladium (Pd) as a catalytically active component, particularly the conversion ratio of hydrocarbons (THC)

The content of the catalytically active component contained in the upper catalyst layer is preferably 0.01 to 1.5 parts by mass relative to 100 parts of the content of the inorganic porous material contained in the catalyst structure. When the proportions of the catalytically active component and the apatite are adjusted so as to obtain such a proportion, sintering of the catalytically active component can be prevented, and dispersibility can be increased.

From such a viewpoint, the content of the catalytically active component contained in the upper catalyst layer is more preferably no less than 0.05 parts by mass or no more than 1.5 parts by mass, and even more preferably no less than 0.1 parts by mass or no more than 1.0 parts by mass, relative to 100 parts by mass of the content of the inorganic porous material contained in the catalyst structure.

Meanwhile, the catalytically active component may exist, for example, in the form of a solid solution with a catalyst carrier such as alumina, or may exist in a state of being supported on a catalyst carrier such as alumina.

(Stabilizer and Other Components)

The upper catalyst layer may contain a stabilizer and other components.

Examples of the stabilizer for the upper catalyst layer include alkaline earth metals and alkali metals. Among them, any one kind or two or more kinds of metals selected from the group consisting of magnesium, barium, boron, thorium, hafnium, silicon, calcium, and strontium can be selected. Among them, from the viewpoint of requiring the highest temperature for the reduction of PdOx, that is, from the viewpoint that it is difficult to be reduced, barium is preferred.

Furthermore, the upper catalyst layer may contain known additive components such as a binder component.

Regarding the binder component, an inorganic binder, for example, a water-soluble solution such as an alumina sol can be used.

<Lower Catalyst Layer>

Examples of the inorganic porous material for the lower catalyst layer include an inorganic porous material having an oxygen storage/release capacity function (OSC function); and a porous material of a compound selected from the group consisting of an apatite type composite oxide, and silica, alumina and titania compounds. The inorganic porous material of the lower catalyst layer may include one kind or two or more kinds of these. It is preferable that the lower catalyst layer is a porous layer containing these inorganic porous materials. Meanwhile, the inorganic porous material that is contained in the lower catalyst layer may have the same composition as that of the inorganic porous material contained in the lower catalyst layer, or may have a different composition. Furthermore, the inorganic porous material of the lower catalyst layer may have the same pore distribution as that of the inorganic porous material contained in the upper catalyst layer, or may have a different pore distribution. However, it is preferable that the inorganic porous material contained in the lower catalyst layer has a different composition or a different pore distribution as that of the inorganic porous material contained in the upper catalyst layer.

Among others, it is preferable that the lower catalyst layer contains a porous OSC material having the oxygen storage/release capacity function (OSC function). When the lower catalyst layer contains the porous OSC material, for example, the apatite type composite oxide of the upper catalyst layer and the OSC material of the lower catalyst layer can sufficiently exhibit the respective characteristics, and gas diffusibility can be maintained, while the function as a three way catalyst can be sufficiently manifested.

At this time, it is preferable that the OSC material occupies 50% by mass or more of the inorganic porous material contained in the lower catalyst layer, and it is more preferable that the OSC material occupies 70% by mass or more, even more preferably 80% by mass or more, and particularly preferably 90% by mass or more (including 100% by mass).

However, the lower catalyst layer may also include, as described above, for example, another inorganic porous material such as a porous material of a compound selected from the group consisting of an apatite type composite oxide, and silica, alumina and titania compounds (the details will be described below).

For example, it is also possible to form the lower catalyst layer using a porous material of an apatite type composite oxide, or a porous material of a silica, alumina or titania compound, as a main inorganic porous material.

(OSC Material)

Examples of the OSC material that is contained in the lower catalyst layer include a cerium compound, a zirconium compound, and a ceria-zirconia composite compound.

(Other Inorganic Porous Material)

Examples of the inorganic porous material that is contained in the lower catalyst layer include inorganic porous materials of an OSC material, an apatite type composite oxide, and a compound selected from the group consisting of, for example, silica, alumina and titania compounds.

More specific examples include inorganic porous materials formed from alumina, silica, silica-alumina, aluminosilicates, alumina-zirconia, alumina-chromia, and alumina-ceria.

Among these, regarding alumina, alumina having a specific surface area of more than 50 m$^2$/g, for example, for example, γ-, δ-, β- and α-alumina can be used. Among them, it is preferable to use γ-alumina. Meanwhile, the alumina may contain a trace amount of La in order to increase heat resistance.

(Catalytically Active Component)

It is preferable that the lower catalyst layer contains a metal such as, for example, palladium (Pd), platinum, rhodium, gold, silver, ruthenium, iridium, nickel, cerium, cobalt, copper, osmium, and strontium.

Among them, it is preferable that the lower catalyst layer contains platinum (Pt) or palladium (Pd), and among them, it is preferable that the lower catalyst layer contains palladium (Pd). When the lower catalyst layer contains palladium (Pd) as a catalytically active component, particularly the conversion ratio of hydrocarbons (THC) can be increased.

The content of the catalytically active component contained in the lower catalyst layer is preferably 0.1 to 10.0 parts by mass, more preferably no less than 1.0 part by mass or no more than 7.0 parts by mass, and even more preferably no less than 3.0 parts by mass or no more than 5.0 parts by mass, relative to 100 parts by mass of the entire lower layer.

Meanwhile, the catalytically active component may exist, for example, in the form of a solid solution with a catalyst carrier such as alumina, or may exist in a state of being supported on a catalyst carrier such as alumina.

(Other Components)

It is preferable that the lower catalyst contains a stabilizer, if necessary.

Examples of the stabilizer for the lower catalyst layer include alkaline earth metals and alkali metals. Among them, one kind or two or more kinds can be selected from metals selected from the group consisting of magnesium, barium, boron, thorium, hafnium, silicon, calcium, and strontium. Among them, from the viewpoint of increasing heat resistance of the OSC material and the inorganic porous material, barium is particularly preferred.

It is preferable that the lower catalyst layer contains a binder, if necessary.

Regarding the binder component, an inorganic binder, for example, a water-soluble solution such as an alumina sol can be used.

The lower catalyst layer may optionally contain other components.

<Substrate>

Examples of the material of the substrate used in the present catalyst structure include refractory materials such as ceramics, and metal materials.

Examples of the material of a ceramic substrate include refractory ceramic materials, for example, cordierite, cordierite-alpha-alumina, silicon nitride, zircon mullite, spodumene, alumina-silica-magnesia, zircon silicate, sillimanite, magnesium silicate, zircon, petalite, alpha-alumina, and aluminosilicates.

Examples of the material of a metal substrate include refractory metals, for example, stainless steel and other adequate anti-corrosive alloys based on iron.

Examples of the shape of the substrate include a honeycomb form, a pellet form, and a spherical form.

In a case in which a honeycomb-shaped substrate is used, for example, a monolithic substrate which has a large number of fine parallel gas circulation passages, that is, channels, inside the substrate such that fluids can be circulated inside the substrate, can be used. At this time, the catalyst layers can be formed by coating the inner wall surfaces of the various channels of the monolithic substrate with a catalyst composition by means of wash coating or the like.

<Layer Thickness>

The proportion of the layer thicknesses of the upper catalyst layer and the lower catalyst layer is preferably such that upper catalyst layer:lower catalyst layer=40:200 to 120:60, more preferably 50:190 to 110:100, and particularly preferably 60:180 to 100:120.

<Preferred Configuration Example of Catalyst Structure>

A preferred configuration example of the present catalyst structure is a configuration example in which the lower catalyst layer and the upper catalyst layer are formed in order from the substrate surface, for example, in a case in which the substrate has a honeycomb shape, from the inner wall surface of the channels inside the substrate.

At this time, it is preferable that the lower catalyst layer is configured to include a catalytically active component such as Pd, Pt or Rh; an inorganic porous material such as alumina; an OSC material such as a ceria-zirconia composite oxide; a binder; and optionally a stabilizer such as Ba hydroxide, and the upper catalyst layer is configured to include a catalytically active component such as apatite, Pd or Pt; a binder; and optionally a stabilizer such as Ba hydroxide.

Furthermore, it is preferable that the upper catalyst layer optionally contains an inorganic porous material such as alumina; and an OSC material such as a ceria-zirconia composite oxide.

<Production Method>

As an example for producing the present catalyst structure, for example, a catalytically active component, an inorganic porous material, an OSC material, a stabilizer, a binder, and water are mixed and stirred to obtain a slurry, and the slurry thus obtained is applied on, for example, a substrate such as a ceramic honeycomb material by wash coating. This resultant is calcined, and thereby a lower catalyst layer is formed on the substrate surface. Subsequently, an upper catalyst layer may be formed in the same manner as described above.

Meanwhile, in the case of an apatite, if the calcination temperature is too low, the apatite may not have macropores, and if the temperature is too high, fine pores may collapse as a result of sintering. Therefore, calcination is preferably carried out at 800° C. to 1200° C.

However, regarding the method for producing the present catalyst structure, any known method can be employed, and the method is not intended to be limited to the example described above.

<Explanation of Expressions>

When the expression "X~Y" (X and Y represent arbitrary numbers) is used in the present specification, unless particularly stated otherwise, the expression includes the meaning of "more than or equal to X and less than or equal to Y", as well as the meaning of "preferably more than X" or "preferably less than Y".

Furthermore, when the expression "no less than X" (X represents an arbitrary number) or "no more than Y" (Y represents an arbitrary number) is used, it is intended to include the meaning of "preferably more than X" or "preferably less than Y".

EXAMPLES

Hereinafter the present invention will be described in more detail by way of Examples and Comparative Examples.

<Production of Apatite (A1)>

Lanthanum nitrate, barium nitrate, Pr nitrate, yttrium nitrate, and colloidal silica were weighed so as to obtain a molar ratio of La:Pr:Ba:Y:Si:O=3.53:1.80: 2.00:1.00:6.00: 24.10, and these were added to deionized water. A transparent solution was obtained by stirring the mixture.

This transparent solution was added dropwise to a mixed solution of aqueous ammonia and ammonium carbonate, and thereby a precipitate was obtained. The precipitate thus obtained was aged for 24 hours at 40° C., and then the precipitate was washed with water, filtered, and dried at 100° C. Thus, a precursor was obtained. Then, this precursor was calcined for 6 hours at 900° C. in an air atmosphere, and thereby a composite oxide was obtained.

The composition of the composite oxide thus obtained was subjected to X-ray diffractometry (XRD). Thus, it was confirmed based on the diffraction peaks that a single phase of apatite was obtained, and also, it was confirmed by an element mass analysis based on ICP that the composite oxide thus obtained was an A-site vacancy apatite ($La_{3.53}Pr_{1.80}Ba_{2.00}Y_{1.00}Si_{6.00}O_{24.10}$).

0.02 g of the composite oxide obtained as described above was placed in a reaction tube made of quartz, and the temperature was increased over a temperature range of 50° C. to 800° C. at a rate of 10° C. per minute, while a 3% hydrogen-$N_2$-balanced gas was circulated at a rate of 20 mL per minute. The mass number 18 of $H_2O$ generated by a reaction between lattice oxygen and hydrogen was measured with a mass analyzer, and the reaction temperature of lattice oxygen was analyzed from the desorption peak of water. From these results, it was found that lattice oxygen was activated.

<Production of Apatites (A2) to (A6)>

Apatites A2 to A6 indicated in Table 1 were produced by changing the pore distribution by changing the calcination temperature in the process for production of the apatite A1. Meanwhile, it was confirmed that all of the apatites A2 to A6 were A-site vacancy apatites ($La_{3.53}Pr_{1.80}Ba_{2.00}Y_{1.00}Si_{6.00}O_{24.10}$)

<Production of Apatite (B)>

Initially, lanthanum nitrate, barium nitrate, yttrium nitrate and colloidal silica weighed so as to obtain a predetermined ratio of $La_{7.33}BaYSi_6O_{25.50}$ were added to deionized water, and a transparent solution was obtained by stirring the mixture. This transparent solution was added dropwise into a mixed solution of aqueous ammonia and ammonium carbonate, and thus a precipitate was obtained. The precipitate thus obtained was aged for 24 hours at 40° C., and then was washed, filtered, and dried at 100° C. Thus, a precursor was obtained. This precursor was calcined for 6 hours at 1000° C., and thereby $La_{7.33}BaYSi_6O_{25.50}$ was obtained as an apatite.

<Other Inorganic Porous Materials>

Meanwhile, for $\alpha$-$Al_2O_3$, $\gamma$-$Al_2O_3$, $CeO_2$, and a ceria-zirconia composite oxide (indicated as "CZ composite oxide" in the table), the pore distributions were regulated by heating treating commercially available products.

Incidentally, the "pore volume diameter of first peak" as used in Table 1 and Table 2 means the pore volume diameter of a first peak having the highest peak height in the logarithmic differential pore volume distribution analyzed by a mercury intrusion porosimeter.

Examples 1 to 8 and Comparative Examples 1 to 4

In Examples 1 to 8 and Comparative Examples 1 to 4, catalyst structures (samples) were produced as follows.

(Lower Catalyst Layer)

91 parts by mass of the inorganic porous material indicated in Table 1 was added to a Pd nitrate solution corresponding to 1 part by mass in terms of Pd metal, the mixture was subjected to a wet pulverization treatment, and then 8 parts by mass of an alumina sol as an inorganic binder was added thereto. Thus, a Pd-containing slurry was obtained.

The Pd-containing slurry thus obtained was applied on a 400-cell honeycomb substrate made of cordierite and having a size of $\phi$105.7 mm×L 114.3 mm, and subsequently the honeycomb substrate was subjected to drying and a 1-hour calcination treatment at 500° C. Thus, a lower catalyst layer was formed.

Meanwhile, the Pd-coating amount was 20 g/cft, and the wash coating amount was 100 g/L.

(Upper Catalyst Layer)

Next, 91 parts by mass of the inorganic porous material indicated in Table 1 was added to a Pd nitrate solution corresponding to 1 part by mass in terms of Pd metal, the mixture was subjected to a wet pulverization treatment, and then 8 parts by mass of an alumina sol as an inorganic binder. Thus, a slurry was obtained.

The slurry thus obtained was applied on the honeycomb substrate made of cordierite, in which the upper catalyst layer had been formed by coating as described above, and subsequently the honeycomb substrate was subjected to drying and a 1-hour calcination treatment at 500° C. Thus, an upper catalyst layer was formed, and thereby a catalyst structure (sample) was produced.

Meanwhile, the wash coating amount for the upper catalyst layer was 70 g/L.

The thicknesses were such that upper catalyst layer:lower catalyst layer=70:160.

<Analysis of Logarithmic Differential Pore Volume Distribution>

The analysis of the logarithmic differential pore volume distribution is a method of analyzing a fine pore (pore) distribution by varying the pressure applied to mercury and measuring the amounts of mercury that has intruded into fine pores at that time.

The conditions in which mercury can intrude into fine pores can be represented by formula: $PD=-4\sigma \cos\theta$ based on the equilibrium of forces, when P represents pressure, D represents the fine pore diameter, and the contact angle and the surface tension of mercury represent $\theta$ and $\sigma$, respectively. At this time, when the contact angle and the surface tension are assumed to be constants, the pressure P and the diameter D of the fine pores into which mercury can intrude at that time are inversely proportional to each other. Therefore, the pressure P and the liquid amount V that intrudes at that time are measured while varying the pressure, and the horizontal axis P of a P-V curve thus obtained is directly substituted with the fine pore diameter from this formula. Thus, a pore distribution can be determined.

The analysis was carried out under the conditions and procedure described below, using an automatic porosimeter "AUTOPORE IV9520" manufactured by Shimadzu Corp. as the analytic apparatus.

(Analysis Conditions)

Environment for analysis: 25° C.

Analytic cell: Actual sample volume 3 $cm^3$, intrusion volume 0.39 $cm^3$

Range of analysis: From 0.0048 MPa to 256.106 Mpa

Analysis points: 131 points (dots were inscribed so as to be at an equal interval based on logarithms of the fine pore diameters)

Intrusion volume: Regulated to be from 25% to 80%.

(Low pressure parameter)
Emission pressure: 50 μmHg
Emission time: 5.0 min
Mercury intrusion pressure: 0.0034 MPa
Equilibrium time: 10 secs
(High pressure parameter)
Equilibrium time: 10 secs
(Mercury parameter)
Advancing contact angle: 130.0 degrees
Receding contact angle: 130.0 degrees
Surface tension: 485.0 mN/m (485.0 dynes/cm)
Mercury density: 13.5335 g/mL
(Analysis procedure)
(1) Each of the catalyst structures (samples) obtained in Examples and Comparative Examples was cored from the center to obtain a volume of 5 mm×5 mm×10 mm, and measurement was carried out therewith.

(2) Measurement was made at 46 points in a low pressure region in the range of from 0.0048 MPa to 0.2068 MPa.

(3) Measurement was made at 85 points in a high pressure region in the range of from 0.2241 MPa to 255.1060 MPa.

(4) The fine pore diameter distribution was calculated from the mercury intrusion pressure and the amount of intruded mercury.

Incidentally, the steps (2), (3) and (4) were carried out automatically by the software attached to the apparatus. Other conditions were set in conformity with JIS R 1655: 2003.

Furthermore, the analysis was carried out similarly in the following Examples as well.

<Method for Evaluating Catalyst Performance>

15 cc each of the catalyst structures (sample) obtained as described above were cored, and those catalysts for exhaust gas purification were individually packed in an evaluation apparatus (motor exhaust gas analyzer MEXA9100 manufactured by Horiba, Ltd.). While a model exhaust gas having the following composition was circulated at a space velocity of 100,000/h, the temperature was increased to 500° C. at a rate of temperature increase of 20° C./min, and the light-off performance was determined. From the results of the light-off performance evaluation thus obtained, the respective temperatures (T50) at which the 50% purification ratios of CO/HC/NO were attained were determined. The results are presented in Table 1.

Model gas composition: A/F=14.6, CO 0.50%, $H_2$ 0.17%, $O_2$ 0.50%, NO (NOx) 500 ppm, $C_3H_6$ (HC) 1200 ppmC, $CO_2$ 14%, $H_2O$ 10%, $N_2$ balance Thereafter, each of the samples that had been cored for the analysis of the purification performance, was placed in an electric furnace maintained at 700° C., and the sample was treated for 25 hours by periodically circulating air (50 s) and a simulated exhaust gas (50 s) composed of $C_3H_6$: 5,000 ppmC and $O_2$: 0.75%, with the balance being $N_2$, which assumed complete combustion. Thereafter, the respective temperatures (T50) at which the 50% purification ratios of CO/HC/NO were attained were determined in the same manner as described above.

TABLE 1

| | Lower catalyst layer | | | | Upper catalyst layer | |
|---|---|---|---|---|---|---|
| | Catalytically active component | Inorganic porous material OSC material | | Binder | Catalytically active component | |
| | Pd Content (parts by mass) | Kind | First peak Pore volume diameter (nm) | Content (parts by mass) | $Al_2O_3$ Content (parts by mass) | Pd Content (parts by mass) | Inorganic porous material Kind |
| Comparative Example 1 | 1 | $CeO_2$ | 5 | 91 | 8 | 1 | Apatite (A1) |
| Example 1 | 1 | $CeO_2$ | 10 | 91 | 8 | 1 | Apatite (A1) |
| Example 2 | 1 | $CeO_2$ | 25 | 91 | 8 | 1 | Apatite (A1) |
| Example 3 | 1 | $CeO_2$ | 30 | 91 | 8 | 1 | Apatite (A1) |
| Example 4 | 1 | $CeO_2$ | 51 | 91 | 8 | 1 | Apatite (A1) |
| Comparative Example 2 | 1 | $CeO_2$ | 61 | 91 | 8 | 1 | Apatite (A1) |
| Comparative Example 3 | 1 | $CeO_2$ | 25 | 91 | 8 | 1 | Apatite (A2) |
| Example 5 | 1 | $CeO_2$ | 25 | 91 | 8 | 1 | Apatite (A3) |
| Example 6 | 1 | $CeO_2$ | 25 | 91 | 8 | 1 | Apatite (A1) |
| Example 7 | 1 | $CeO_2$ | 25 | 91 | 8 | 1 | Apatite (A4) |
| Example 8 | 1 | $CeO_2$ | 25 | 91 | 8 | 1 | Apatite (A5) |
| Comparative Example 4 | 1 | $CeO_2$ | 25 | 91 | 8 | 1 | Apatite (A6) |

| | Upper catalyst layer | | Catalyst structure | | Catalyst performance | | |
|---|---|---|---|---|---|---|---|
| | Inorganic porous material | Binder | Fine pore distribution | | evaluation T50 | | |
| | First peak Pore volume diameter (nm) | Content (parts by mass) | $Al_2O_3$ Content (parts by mass) | first peak Pore volume diameter (nm) | Second peak Pore volume diameter (nm) | NOx (° C.) | CO (° C.) | CH (° C.) |
| Comparative Example 1 | 70 | 91 | 8 | 5 | 71 | 345 | 300 | 330 |
| Example 1 | 70 | 91 | 8 | 11 | 70 | 332 | 268 | 303 |
| Example 2 | 70 | 91 | 8 | 24 | 69 | 335 | 269 | 300 |
| Example 3 | 70 | 91 | 8 | 39 | 68 | 331 | 265 | 302 |
| Example 4 | 70 | 91 | 8 | 50 | 70 | 336 | 264 | 305 |

TABLE 1-continued

|  |  |  |  |  |  |  |  |  |
|---|---|---|---|---|---|---|---|---|
| Comparative Example 2 | 70 | 91 | 8 | 60 | 71 | 344 | 305 | 332 |
| Comparative Example 3 | 39 | 91 | 8 | 25 | 40 | 345 | 298 | 328 |
| Example 5 | 51 | 91 | 8 | 24 | 50 | 335 | 260 | 300 |
| Example 6 | 70 | 91 | 8 | 26 | 69 | 332 | 265 | 305 |
| Example 7 | 81 | 91 | 8 | 26 | 82 | 338 | 262 | 302 |
| Example 8 | 99 | 91 | 8 | 25 | 100 | 331 | 267 | 301 |
| Comparative Example 4 | 112 | 91 | 8 | 26 | 111 | 346 | 295 | 330 |

According to the results of Table 1 and the results of tests carried out so far, it was found that when an upper catalyst layer containing an inorganic porous material formed of apatite and a lower catalyst layer containing an OSC material are laminated, the respective characteristics of the apatite type composite oxide and the OSC material can be sufficiently manifested.

Furthermore, it was found that when the pore distribution of the catalyst structure is adjusted so as to have a first peak or a second peak at a pore volume diameter of 10 nm to 50 nm and a pore volume diameter of 50 nm to 100 nm, respectively, the gas diffusibility to the deep part of the catalyst layer can be increased, the T50 value for any of NOx, CO or CH is decreased, and the functions as a three way catalyst can be sufficiently exhibited.

Furthermore, it was also found that when an apatite, particularly an A-site vacancy apatite, is used as the inorganic porous material contained in the upper catalyst layer, the adsorption characteristics of NOx are further improved, and the purification performance for NOx is further enhanced.

Examples 9 to 13 and Comparative Example 5

In Examples 9 to 13 and Comparative Example 5, catalyst structures (samples) were produced as follows.

(Lower Catalyst Layer)

91 parts by mass of the inorganic porous material indicated in Table 2 was added to a Pd nitrate solution corresponding to 1 part by mass in terms of Pd metal, the mixture was subjected to a wet pulverization treatment, and then 8 parts by mass of an alumina sol as an inorganic binder was added thereto. Thus, a Pd-containing slurry was obtained.

The Pd-containing slurry thus obtained was applied on a 400-cell honeycomb substrate made of cordierite and having a size of φ105.7 mm×L 114.3 mm, and subsequently the honeycomb substrate was subjected to drying and a 1-hour calcination treatment at 500° C. Thus, a lower catalyst layer was formed.

Meanwhile, the Pd-coating amount was 20 g/cft, and the wash coating amount was 100 g/L.

(Upper Catalyst Layer)

Next, 91 parts by mass of the inorganic porous material indicated in Table 2 was added to a Pd nitrate solution corresponding to 1 part by mass in terms of Pd metal, the mixture was subjected to a wet pulverization treatment, and then 8 parts by mass of an alumina sol as an inorganic binder. Thus, a slurry was obtained.

The slurry thus obtained was applied on the honeycomb substrate made of cordierite, in which the upper catalyst layer had been formed by coating as described above, and subsequently the honeycomb substrate was subjected to drying and a 1-hour calcination treatment at 500° C. Thus, an upper catalyst layer was formed, and thereby a catalyst structure (sample) was produced.

Meanwhile, the wash coating amount for the upper catalyst layer was 70 g/L.

<Method for Evaluating Resistance to Phosphorus Poisoning>

Two specimens of each of the catalyst structures (samples) obtained in Examples and Comparative Examples were prepared, and one of the specimens was subjected to an accelerated deterioration test (durability test) using an actual automotive engine, in order to check whether the catalyst structure maintained catalytic activity even after driving under certain conditions, and particularly to check the influence of phosphorus poisoning.

First, each of the catalyst structures (samples) obtained in Examples and Comparative Examples was mounted in an exhaust pipe, and a thermocouple was inserted at the center of the honeycomb. This exhaust pipe was fitted to an engine, and the speed of engine rotation/torque and the like were regulated such that the temperature of the thermocouple would be 750° C.±20° C. At this time, a cycle test of repeating the A/F ratio between 14 and 15 for a certain period of time was carried out, and in order to accelerate phosphorus poisoning, engine oil was added at the upstream of the catalyst at a rate of 6 mL/hour, while the durability test time was set to 150 hours.

On the other hand, 15 cc each of the catalyst structure that had been subjected to the durability test described above and the other catalyst structure obtained in an Example or a Comparative Example (that has not been subjected to the durability test) were respectively cored, and those catalyst structures were individually packed in an evaluation apparatus. The temperature was increased to 500° C. at a rate of temperature increase of 20° C./min, while a model exhaust gas having the composition indicated in the following Table 2 was circulated at a space velocity of 100,000/h, and the purification ratio of the model gas at 400° C. ($\eta 400$) (%) was measured. The deterioration ratio (100−(purification ratio after durability test)/(purification ratio before durability test)×100) was calculated, and the results are presented in Table 2.

TABLE 2

| | Lower catalyst layer | | | | Upper catalyst layer | | |
|---|---|---|---|---|---|---|---|
| | Catalytically active component | Inorganic porous material | | Binder | Catalytically active component | Inorganic porous material | |
| | Pd Content (parts by mass) | Kind | First peak Pore volume diameter (nm) | Content (parts by mass) | $Al_2O_3$ Content (parts by mass) | Pd Content (parts by mass) | Kind | First peak Pore volume diameter (nm) |
| Comparative Example 5 | 1 | $\alpha$-$Al_2O_3$ | 62 | 91 | 8 | 1 | CS composite compound | 69 |
| Example 9 | 1 | $\gamma$-$Al_2O_3$ | 11 | 91 | 8 | 1 | CS composite compound | 69 |
| Example 10 | 1 | $CeO_2$ | 25 | 91 | 8 | 1 | CS composite compound | 69 |
| Example 11 | 1 | $CeO_2$ | 25 | 91 | 8 | 1 | $\alpha$-$Al_2O_3$ | 62 |
| Example 12 | 1 | $CeO_2$ | 25 | 91 | 8 | 1 | Apatite (B) | 60 |
| Example 13 | 1 | $CeO_2$ | 25 | 91 | 8 | 1 | Apatite (A1) | 70 |

| | Upper catalyst layer | | Catalyst structure | | Evaluation for resistance to phosphorus poisoning | | |
|---|---|---|---|---|---|---|---|
| | Inorganic porous material Content (parts by mass) | Binder $Al_2O_3$ Content (parts by mass) | Fine pore distribution | | NOx | NC | CO |
| | | | First peak Pore volume diameter (nm) | Second peak Pore volume diameter (nm) | deterioration ratio of $\eta$-400 (%) | deterioration ratio of $\eta$-401 (%) | deterioration ratio of $\eta$-402 (%) |
| Comparative Example 5 | 91 | 8 | 60 | 72 | 15 | 41 | 31 |
| Example 9 | 91 | 8 | 10 | 72 | 13 | 29 | 25 |
| Example 10 | 91 | 8 | 24 | 72 | 10 | 25 | 18 |
| Example 11 | 91 | 8 | 25 | 63 | 7 | 19 | 14 |
| Example 12 | 91 | 8 | 26 | 62 | 5 | 15 | 10 |
| Example 13 | 91 | 8 | 24 | 69 | 4 | 13 | 9 |

DISCUSSION

Regarding the inorganic porous material contained in the upper catalyst layer, it was found that excellent evaluation results for the resistance to phosphorus poisoning are obtained when an apatite is used rather than a ceria-zirconia composite oxide, and among them, superior evaluation results for the resistance to phosphorus poisoning are obtained when an A-site vacancy apatite is used.

However, as can be seen from the results of Examples 9 to 13, it was confirmed that even if the inorganic porous material contained in the upper catalyst layer is an inorganic porous material other than an apatite, for example, an OSC material such as a ceria-zirconia composite oxide or an inorganic porous material such as alumina, when the pore volume distributions in the various layers are adjusted, gas diffusibility to the deep part can be increased, and the function as a three way catalyst can be sufficiently manifested.

The invention claimed is:

1. A catalyst structure for exhaust gas treatment comprising a substrate, an upper catalyst layer, and a lower catalyst layer, each of the upper catalyst layer and the lower catalyst layer comprising an inorganic porous material and a catalytically active component, wherein the inorganic porous material of the upper catalyst layer comprises an oxide having a La-based apatite type structure represented by $(LaA)_{9.33-\delta}B_6O_{27.00-\gamma}$, where A is one or more elements selected from a group consisting of Ba, Pr, Y, Sr, Mg and Ce, B is one or more elements selected from a group consisting of Si, P and Fe, $0.3 \leq \delta \leq 3.0$ and $0.0 < \gamma \leq 6.0$, the catalytically active component of the upper catalyst layer comprises platinum, palladium, rhodium or iridium, the inorganic porous material of the lower catalyst layer has an oxygen storage/release capacity function, the catalytically active component of the lower catalyst layer comprises platinum or palladium, the inorganic porous material of the upper catalyst layer has a first peak having a highest peak height at a fine pore diameter of 70 nm to 99 nm in a logarithmic differential pore volume distribution of the inorganic porous material of the upper catalyst layer analyzed by a mercury intrusion porosimeter, the inorganic porous material of the lower catalyst layer has a first peak having a highest peak height at a fine pore diameter of 10 nm to 51 nm in a logarithmic differential pore volume distribution of the inorganic porous material of the lower catalyst layer analyzed by the mercury intrusion porosimeter, in a fine pore diameter range of 10 nm to 100 nm of a logarithmic differential pore volume distribution of the catalyst structure for exhaust gas treatment analyzed by the mercury intrusion porosimeter, a first peak having a highest peak height exists at a fine pore diameter of 10 nm to 50 nm and a second peak having a second highest peak height exists at a fine pore diameter of 50 nm to 100 nm, and a difference between the fine pore diameter of the first peak and the fine pore diameter of the second peak is 20 nm to 60 nm.

2. The catalyst structure for exhaust gas treatment according to claim 1, wherein a proportion of a layer thickness of the upper catalyst layer and a layer thicknesses of the lower catalyst layer is 60:180 to 100:120.

3. The catalyst structure for exhaust gas treatment according to claim 1, wherein the oxide having the La-based apatite type structure occupies 50% by mass or more of the inorganic porous material included in the upper catalyst layer, and the inorganic porous material having the oxygen storage/release capacity function occupies 50% by mass or more of the inorganic porous material included in the lower catalyst layer.

* * * * *